Patented Apr. 26, 1927.

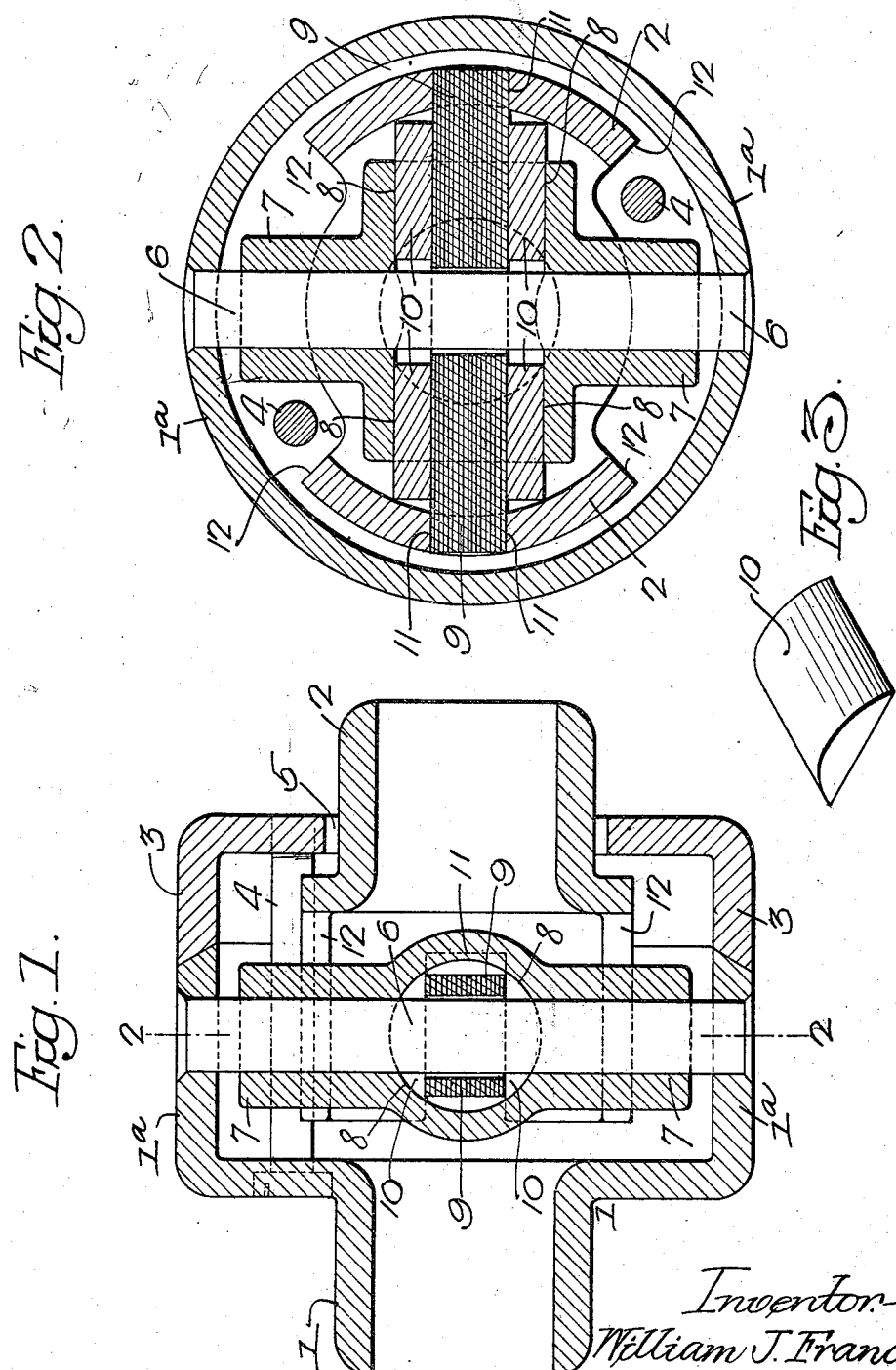

1,626,458

UNITED STATES PATENT OFFICE.

WILLIAM J. FRANCKE, OF NEW BRUNSWICK, NEW JERSEY, ASSIGNOR, BY MESNE ASSIGNMENTS, TO JOHN WALDRON CORPORATION, OF NEW BRUNSWICK, NEW JERSEY, A CORPORATION OF NEW JERSEY.

FLEXIBLE COUPLING.

Application filed October 21, 1922. Serial No. 595,982.

The object of this invention is to provide a flexible coupling having novel and improved features of construction as hereinafter described, and in which a plane bearing surface between the coupled elements is maintained under all conditions.

A further object is to provide a flexible coupling in which the aforesaid plane bearing surface may be maintained without flexible connecting members.

In the attached drawings:

Figure 1, is a longitudinal section through the coupling;

Fig. 2, is a section taken on the line 2—2, Fig. 1, and

Fig. 3, is a view in perspective of one of the bearing elements.

With reference to the drawings, my invention comprises a pair of coupling elements or flanges 1 and 2 adapted respectively to be secured to the ends of the shafts which it may be desired to couple. The flanged portion of the member 1 is of considerably greater diameter than the corresponding portion of the member 2 and constitutes with a cup-shaped member 3 which is secured to the member 1 by means of bolts 4, a housing for the greater portion of the flange 2. The hub portion of this latter flange projects through an opening 5 in the member 3.

Mounted in the coupling 1 and extending diametrically across the flanged portion 1ª of this member 1 is a cylindrical pin 6, the ends of the pin being in the present instance riveted in the member 1, as clearly shown in Fig. 1. Journaled on the pin 6 is a cross-shaped element 7 comprising bearing openings 8, 8, on opposite sides thereof in which is journaled a connector element 9 apertured at its center for passage of the pin 6, there being provided in the bearing openings 8, 8, on opposite sides of the element 9, which in the present instance is of rectangular section, segmental bearing elements 10, the flat faces of which rest against the sides of the element 9, while the curved surfaces which conform to the arc of the bearing openings 8 fit neatly against the curved surfaces of the latter.

As clearly shown in the drawings, the aforesaid central opening in the element 9 is of sufficiently greater diameter than the diameter of the pin 6 to provide for angular movement of the latter. That portion of the member 2 which occupies the interior of the member 1 is slotted at 11 at each side for the reception of the projecting ends of the element 9, the latter fitting neatly the said slots in the member 2, the member also being recessed at 12, 12, for clearance for the member 7.

In the present instance, the bar 9 is shown constructed of a plurality of shims laid flat against each other, but it will be apparent that all the requirements of the coupling are met even when this bar is made of an integral piece of metal and is rigid. Angular misalignment of the shafts is compensated for by oscillation of the member 7 on the pin 6, and by oscillation of the element 9 and the associated bearing elements 10 within the bearings 8, 8, while parallel misalignment is compensated for by movement of the member 7 longitudinally of the pin 6 and movement of the element 9 longitudinally in the bearings 8, 8. Float also is provided for as well as cushioning in the direction of the drive, and it will be noted that in each movement of the coupling in compensating for either misalignment or for the other conditions, a plane bearing surface is maintained between the coupling elements, and that this plane bearing surface is maintained whether or not the member 9 is flexible.

I claim:

A flexible coupling comprising a pair of coupling members adapted respectively to be attached to the adjacent ends of two shafts, one of said members having aligned slots extending in an axial direction, a cylindrical pin extending transversely across the other of said members, an element journaled on the pin and having a through cylindrical opening transverse to the pin axis, a flat flexible element extending through the said opening and having a central aperture for passage of the pin, the ends of said flexible element entering the slots on the coupling member first named, and keepers on opposite sides of the flexible element having curved outer faces conforming with the cylindrical opening and neatly fitted to the latter.

WILLIAM J. FRANCKE.